United States Patent
Muraki

(10) Patent No.: US 7,235,733 B2
(45) Date of Patent: Jun. 26, 2007

(54) MUSICAL TONE REPRODUCING APPARATUS AND PORTABLE TERMINAL APPARATUS

(75) Inventor: Yasuyuki Muraki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 10/722,254

(22) Filed: Nov. 25, 2003

(65) Prior Publication Data

US 2004/0159217 A1 Aug. 19, 2004

Related U.S. Application Data

(63) Continuation of application No. PCT/JP02/04950, filed on May 22, 2002.

(30) Foreign Application Priority Data

May 25, 2001 (JP) ........................... 2001-156622

(51) Int. Cl.
*G10H 7/00* (2006.01)
*G04B 13/00* (2006.01)

(52) U.S. Cl. ............................. 84/609; 84/602; 84/610; 84/622

(58) Field of Classification Search ........... 84/600–606, 84/609–610, 615, 622–627, 634, 649–650, 84/653, 659–663
See application file for complete search history.

(56) References Cited

U.S. PATENT DOCUMENTS 5,489,746 A * 2/1996 Suzuki et al. ................. 84/602

(Continued)

FOREIGN PATENT DOCUMENTS

JP 08-335084 12/1996

(Continued)

OTHER PUBLICATIONS

Korean Patent Office, Office Action, (Jul. 26, 2005).

*Primary Examiner*—Marlon Fletcher
(74) *Attorney, Agent, or Firm*—Pillsbury Winthrop Shaw Pittman LLP

(57) ABSTRACT

There is provided a musical tone reproducing apparatus, which stores tone color parameters in a general-purpose storage means, to thereby shorten the time taken for a tone color changing process. A CPU 10 registers a tone color parameter group that has been read out from a RAM 11 in a tone generator memory 30, which is a general-purpose memory, in advance. The tone color parameters required when a tone generation core 33 carries out musical tone reproduction are stored in a cache memory 32 for all channels. Upon the CPU 10 giving a tone color changing command to a controller 31, a specified tone color parameter is read out from the tone generator memory 30. The tone color parameter for a specified channel in the cache memory 32 is then rewritten with the read out tone color parameter. The tone generation core 33 reads out from the cache memory 32 the rewritten tone color parameter set for each channel, and hence musical tone reproduction with a changed tone color is carried out. Because a tone color parameter group of a freely chosen number of tone color parameters has been registered in the tone generator memory 30, the need to transfer a tone color parameter from the CPU 10 to the tone generator memory 30 each time a tone color is to be changed can be removed as much as possible. Moreover, the output bit width of the cache memory 32 is made to be large, and hence the tone color parameter the tone color parameter can be set into the tone generator means instantaneously. Consequently, even though the tone color parameters are stored in advance in the general-purpose storage means, the time taken for the tone color changing process can be shortened, and hence the occurrence of a break in sound generation during tone color changing can be prevented.

6 Claims, 8 Drawing Sheets

U.S. PATENT DOCUMENTS

| | | | | |
|---|---|---|---|---|
| 5,698,802 | A | * | 12/1997 | Kamiya ........................ 84/604 |
| 5,850,051 | A | * | 12/1998 | Machover et al. ............. 84/634 |
| 5,895,449 | A | * | 4/1999 | Nakajima et al. ........... 704/278 |
| 5,981,859 | A | * | 11/1999 | Suzuki ........................ 84/601 |
| 6,184,454 | B1 | * | 2/2001 | Imai et al. .................... 84/622 |
| 6,570,082 | B2 | * | 5/2003 | Mukaino et al. .............. 84/622 |
| 2003/0110928 | A1 | * | 6/2003 | Yamaki et al. ................ 84/615 |
| 2004/0069120 | A1 | * | 4/2004 | Muraki ........................ 84/609 |
| 2004/0069124 | A1 | * | 4/2004 | Murakai et al. .............. 84/622 |

FOREIGN PATENT DOCUMENTS

| | | |
|---|---|---|
| JP | 11312085 A | 11/1999 |
| JP | 2000-276172 A | 10/2000 |
| JP | 2002-276172 | 10/2000 |

* cited by examiner

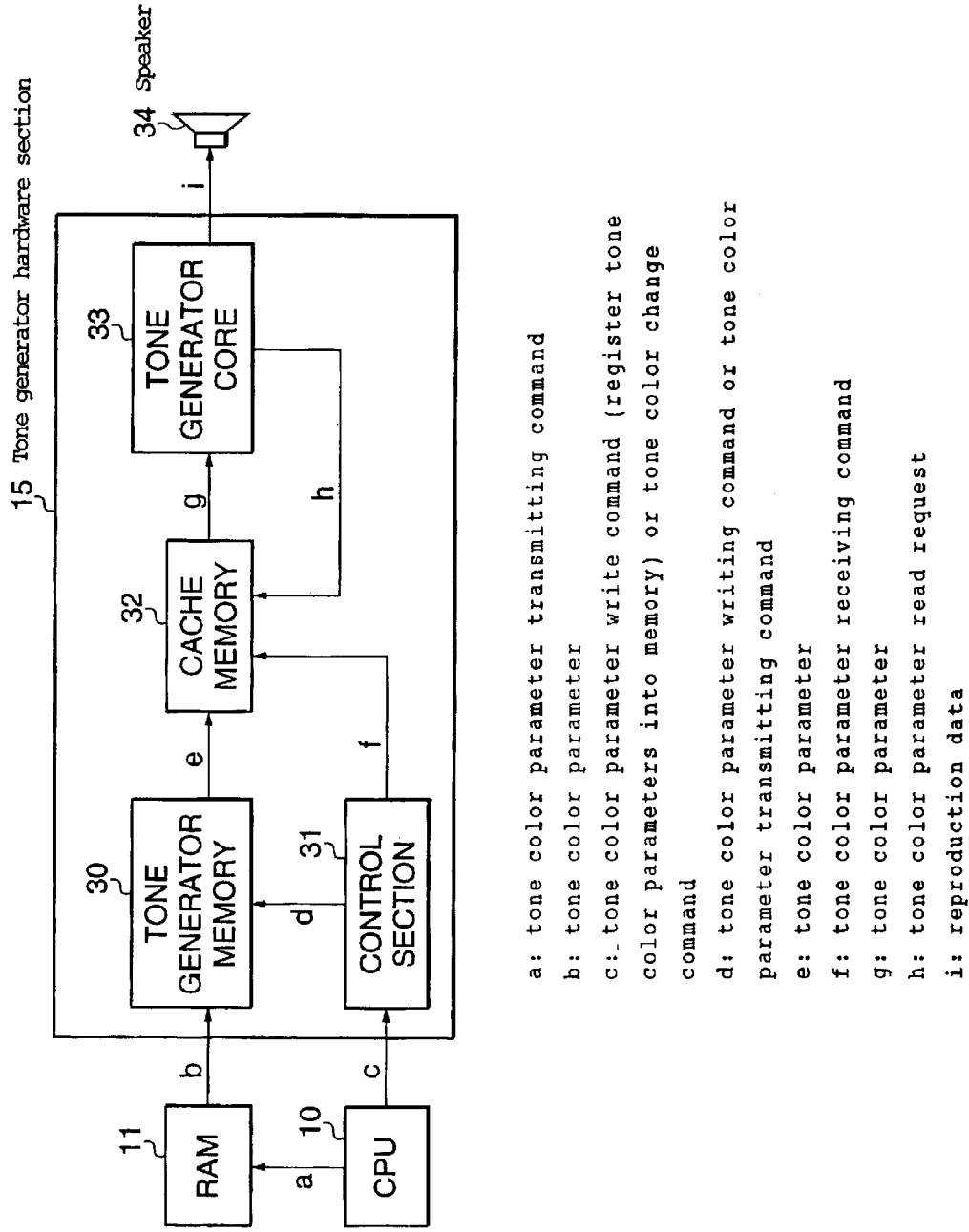

FIG. 2 a: tone color parameter transmitting command
b: tone color parameter
c: tone color parameter write command (register tone color parameters into memory) or tone color change command
d: tone color parameter writing command or tone color parameter transmitting command
e: tone color parameter
f: tone color parameter receiving command
g: tone color parameter
h: tone color parameter read request
i: reproduction data

FIG. 5

| Channel | | | | | | | | |
|---|---|---|---|---|---|---|---|---|
| #0 | SR | XOF | ERB | SUS | KSR | RR | ····· | FB |
| #1 | SR | XOF | ERB | SUS | KSR | RR | ····· | FB |
| #2 | SR | XOF | ERB | SUS | KSR | RR | ····· | FB |
| ⋮ | | | | | | | | |
| #N | SR | XOF | ERB | SUS | KSR | RR | ····· | FB |

|←——————— SEVERAL TENS OF BITS ———————→|

(N: [MAX. NO. OF CHANNELS THAT CAN BE SIMULTANEOUSLY SOUNDED] − 1)

MUSICAL TONE REPRODUCING APPARATUS AND PORTABLE TERMINAL APPARATUS

RELATED APPLICATIONS

This application is a continuation of PCT application No. PCT/JP02/04950, filed May 22, 2002, which is based upon, and claims priority from, Japanese Patent Application No. 2001-156622, filed May 25, 2001.

BACKGROUND OF THE INVENTION

1. Technical Field

The present invention relates to a musical tone reproducing apparatus capable of changing tone color, and a portable terminal apparatus having the musical tone reproducing apparatus.

2. Background Art

Conventional musical tone reproducing apparatuses include ones that generate musical tones using hardware. Such a musical tone reproducing apparatus is constructed such that the tone color of reproduced musical tones can be changed.

An example of the construction of such a musical tone reproducing apparatus is shown in FIG. 10, and a description will now be given of the changing of the tone color. In FIG. 10, a CPU (central processing unit) 110 reads sequence data such as MIDI (musical instrument digital interface) data or SMAF (synthetic music mobile application format) data out from a RAM (random access memory) 111, and supplies the sequence data to a tone generator hardware section 115. The tone generator hardware section 115 reproduces the sequence data supplied from the RAM 111, and accordingly outputs musical tone signals to a speaker 134. The tone generator hardware section 115 is comprised of a tone color parameter storage region 130, and a data processing section 133 that carries out a musical tone reproducing process. The tone color parameter storage region 130 is comprised of registers or regions reserved in the RAM 111.

In the musical tone reproducing apparatus constructed as above, when changing the tone color of a musical tone to be reproduced, the CPU 110 gives a tone color changing command to the tone color parameter storage region 130, and also reads a tone color parameter for the tone color to be changed to out from the RAM 111, and writes the tone color parameter into the tone color parameter storage region 130. Once musical tone reproduction timing been has reached, the data processing section 133 reads the tone color parameter for the tone color to be changed to out from the tone color parameter storage region 130, and carries out musical tone reproduction with a tone color changed using the tone color parameter. Note that much sequence data and a plurality of tone color parameters (a tone color parameter group) can be stored in the RAM 111.

In such a conventional musical tone reproducing apparatus, when changing the tone color, the CPU 110 reads the tone color parameter for the tone color to be changed to out from the RAM 111 and transfers the tone color parameter to the tone generator hardware section 115 as described above. In this case, because the data bus width of the tone generator hardware section 115 is approximately 8 bits, the bit width of the RAM or registers constituting the tone color parameter storage region 130, i.e. the bit width of the stored data, is also limited to being approximately 8 bits. However, one or more tone color parameters for one channel required when the data processing section 133 carries out the tone reproducing process for one channel are comprised of many bits, specifically several tens of bits. Consequently, with a RAM or registers having a bit width of 8 bits, it has been necessary for the one or more tone color parameters for one channel required when the data processing section 133 carries out the tone reproducing process for one channel to be read out divided into a plurality of times each of 8 bits. As a result, a problem has arisen that a long time is required to read out the tone color parameter for a tone color to be changed to from the tone color parameter storage region 130 and set the tone color parameter in the data processing section 133, and hence the processing time becomes long.

If the processing time becomes long as described above, then a break may occur in sound generation. To resolve this, one can envisage increasing the operating speed of the RAM or registers constituting the tone color parameter storage region 130. However, there has been a problem that if the operating speed of the RAM or registers is increased, then the electric power consumption thereof increases, and hence a battery that is used to operate a portable terminal apparatus in which the musical tone reproducing apparatus is installed is used up quickly. Moreover, every time a tone color is to be changed, the CPU 110 must transfer the tone color parameter for the tone color to be changed to from the RAM 111 to the tone generator hardware section 115, and hence there has been a problem that the amount of data transfer between the tone generator hardware section 115 and the CPU 110 increases.

Furthermore, if the tone color parameter storage region 130 is comprised of registers exclusively for this purpose, then reading out from a freely chosen number of registers can be carried out simultaneously, but the tone color parameter storage region 130 becomes a region exclusively for tone color parameters, and hence a problem arises that if the tone color parameter storage region 130 is also used for general-purpose data having a width of 8 bits other than tone color parameters, then the efficiency of usage of the tone color parameter storage region 130 as a memory becomes poor.

Moreover, if the tone color parameter storage region 130 is comprised of a RAM having a large bit width, then a tone color parameter having a large bit width can be read out at a time, but the tone color parameter storage region 130 becomes a region exclusively for tone color parameters, and hence a problem again arises that if the tone color parameter storage region 130 is also used for general-purpose data having a width of 8 bits other than tone color parameters, then the efficiency of usage of the tone color parameter storage region 130 as a memory becomes poor.

It is thus an object of the present invention to provide a musical tone reproducing apparatus which stores tone color parameters in a general-purpose storage means, to thereby shorten the time taken for a tone color changing process, and a portable terminal apparatus having the musical tone reproducing apparatus.

DISCLOSURE OF THE INVENTION

To attain the above object, a musical tone reproducing apparatus of the present invention provides in a portable terminal apparatus having system storage means as a general-purpose memory for storing various data including a tone color parameter group and system control means for controlling the whole apparatus including the system storage means, and that carries out musical tone reproduction in cooperation with the system storage means and the system control means, the musical tone reproducing apparatus comprising a tone generator memory as a general-purpose memory in which is registered at least a tone color parameter group comprising a freely chosen number of tone color parameters read out from the system storage means, a cache memory into which are inputted tone color parameters from the registered tone color parameter group at a predetermined data width from the tone generator memory and from which are outputted the inputted tone color parameters at a data width larger than the predetermined data width, tone generator means for carrying out musical tone reproduction based on tone color parameters outputted from the cache memory, and tone generator control means for controlling the musical tone reproducing apparatus based on commands from the system control means, wherein, based on a command for tone color parameter registration from the system control means, the tone generator control means carries out control such that predetermined addresses are given to the tone color parameters in the tone color parameter group read out from the system storage means and the tone color parameters are stored in the tone generator memory, and based on a command from the system control means to change a tone color set in the tone generator means, the tone generator control means carries out control such that a tone color parameter for the tone color to be changed to is read out from a freely chosen address in the tone generator memory and is transferred to the cache memory, and the tone color parameter for the tone color to be changed to is transferred from the cache memory to the tone generator means.

Moreover, with the musical tone reproducing apparatus of the present invention described above, preferably, the system control means reads out each of the tone color parameters from the tone generator memory by specifying a leading address of the predetermined addresses given to the tone color parameters.

Furthermore, with the musical tone reproducing apparatus of the present invention described above, preferably, the system control means writes into the system storage means and reads out from the system storage means leading addresses of the predetermined addresses given to the tone color parameters stored in the tone generator memory.

Moreover, with the musical tone reproducing apparatus of the present invention described above, preferably, the tone generator memory outputs to the cache memory at a data width smaller than one channel's worth of the tone color parameters.

Moreover, with the musical tone reproducing apparatus of the present invention described above, preferably, the cache memory outputs at least one channel's worth of the tone color parameters to the tone generator means at a time.

Moreover, with the musical tone reproducing apparatus of the present invention described above, preferably, the tone generator means carries out the musical tone reproduction based on sequence data that has been converted into a predetermined format.

Moreover, with the musical tone reproducing apparatus of the present invention described above, preferably, the tone generator memory comprises a first tone generator memory and a second tone generator memory, and the tone generator control means determines whether a leading address contained in a command from the system control means is within the first tone generator memory or within the second tone generator memory, and reads out a tone color parameter corresponding to the leading address within the first tone generator memory or the second tone generator memory.

Furthermore, with the musical tone reproducing apparatus of the present invention described above, preferably, the first tone generator memory is a RAM (random access memory), and the second tone generator memory is a ROM (read only memory).

Moreover, with the musical tone reproducing apparatus of the present invention described above, preferably, the portable terminal apparatus has data receiving means for receiving external data, and data received by the data receiving means is stored in the system storage means.

To attain the above object, a portable terminal apparatus of the present invention has a musical tone reproducing apparatus as described above, wherein the system control means carries out a portable terminal apparatus function process as a main process.

BRIEF DESCRIPTION OF THE DRAWINGS

FIG. 2 is a diagram showing an example of the construction of a musical tone reproducing apparatus installed in the portable terminal apparatus shown in FIG. 1;

FIG. 5 is a diagram showing an example of the data structure of tone color parameters stored in a tone color cache memory appearing in FIG. 3;

BEST MODE FOR CARRYING OUT THE INVENTION

The present invention will now be described with reference to the drawings showing a preferred embodiment thereof.

Figure 1:
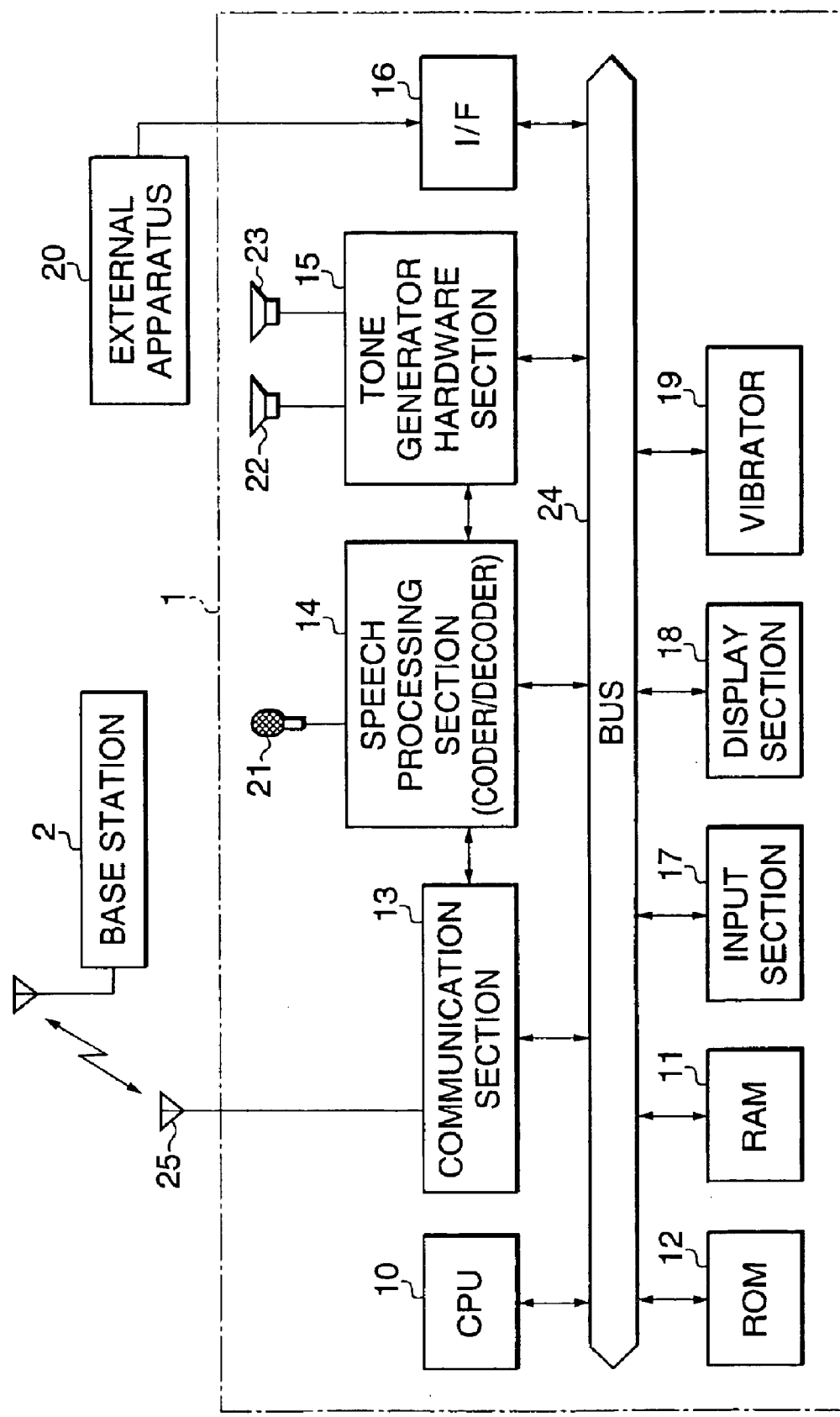
FIG. 1 is a diagram showing an example of the construction of a portable terminal apparatus according to an embodiment of the present invention.

FIG. 1 is a diagram showing an example of the construction of a portable terminal apparatus according to an embodiment of the present invention.

In FIG. 1, a mobile phone 1, which is the portable terminal apparatus, and which generally has a retractable antenna 25, can be connected to a base station 2 by a wireless communication line. The antenna 25 is connected to a communication section 13 having functions of modulation and demodulation. A CPU (central processing unit) 10 serves as a system controller that controls operations of various sections of the mobile phone 1 by executing telephone function programs, and is provided with a timer (not shown) that shows elapsed time in the operations and generates a timer interrupt at predetermined time intervals. Moreover, the CPU 10 transfers sequence data by a predetermined amount at a time to a tone generator hardware section 15 during musical tone reproduction carried out, for example, upon receipt of an incoming call. A RAM (random access memory) 11 has set therein a storage area for sequence data downloaded from a downloading center or the like connected via the base station 2, a work area for the CPU 10, and so on.

A ROM (read only memory) 12 stores various programs executed by the CPU 10 including various telephone function programs for carrying out transmission and reception and programs for carrying out processes relating to musical tone reproduction and the like, and also various kinds of data such as preset sequence data.

The communication section 13 demodulates a signal received by the antenna 25, and modulates a signal to be transmitted to the base station 2 and supplies the modulated signal to the antenna 25. An incoming speech signal that has been demodulated by the communication section 13 is decoded by a speech processing section (coder/decoder) 14, and a speech signal inputted via a microphone 21 is subjected to compression encoding by the speech processing section 14. The speech processing section 14, which subjects the speech to efficient compression encoding/decoding, is comprised, for example, of a coder/decoder of CELP (Code Excited LPC) type or ADPCM (Adaptive Differential PCM coding) type. The tone generator hardware section 15 is able to sound the incoming speech signal from the speech processing section 14 through an incoming speech speaker 22, and generate and output an incoming call melody and holding music by reproducing the sequence data. The incoming call melody is sounded from an incoming call speaker 23, and the holding music is mixed with the incoming speech signal and sounded from the incoming speech speaker 22.

The format of the sequence data is a MIDI (Musical Instrument Digital Interface) format or a SMAF (Synthetic Music Mobile Application Format) format, which is convenient for data distribution. The tone generator hardware section 15 converts sequence data of such a format into control data of a format peculiar to a tone generator core built into the tone generator hardware section 15, and reproduces the converted data. Alternatively, the CPU 10 may convert the sequence data into control data of a format peculiar to the tone generator hardware section 15, store the converted data in the RAM 11, and read out the same from the RAM 11 and supply the same to the tone generator hardware section 15 during reproduction. The tone generator hardware section 15 has provided therein a general-purpose RAM in which is registered a tone color parameter group of a freely chosen number of tone color parameters, a cache memory having a large output bit width, and the tone generator core. The tone color parameter group registered in the general-purpose RAM is, for example, a tone color parameter group according to General MIDI Standard. The cache memory stores tone color parameters for a tone color specified for each channel, and the tone generator core can read out a tone color parameter for one channel required for musical tone reproduction for that channel by accessing the cache memory only once or a few times.

An interface (I/F) 16 is for downloading sequence data and so on from an external apparatus 20 such as a personal computer. An input section 17 serves as an input means comprised of dialing buttons "0" to "9" and various other buttons provided in the mobile phone 1. A display section 18 is comprised of a display device that displays telephone function menus and other displays according to operations of the buttons such as the dialing buttons. A vibrator 19 notifies a user of incoming calls by vibrating the main body of the mobile phone 1 instead of the incoming call melody when there is an incoming call. Moreover, the various function blocks transfer and receive data and so on via a bus 24.

Next, an example of the construction of a musical tone reproducing apparatus installed in the portable terminal apparatus shown in FIG. 1 is shown in FIG. 2. Note, however, that in FIG. 2, the incoming speech speaker 22 and the incoming call speaker 23 are shown as a speaker 34, i.e. the constructions of the incoming speech speaker 22 and the incoming call speaker 23 are omitted. Moreover, data transfer between the CPU 10, the tone generator hardware section 15 and the RAM 11 is carried out via the bus 24, but the bus 24 is not shown in FIG. 2.

In the musical tone reproducing apparatus shown in FIG. 2, sequence data, and a tone color parameter group for various tone colors according to the General MIDI Standard or the like, are stored in the RAM 11. The tone color parameter group according to the General MIDI Standard or the like stored in the RAM 11 are transferred to and registered in a tone generator memory 30 of the tone generator hardware section 15 under the control of the CPU 10. When registering a tone color parameter group in the tone generator memory 30, the CPU 10 gives a tone color parameter transmitting command a to the RAM 11, and the tone color parameters in the tone color parameter group to be registered are sequentially read out, and the read out tone color parameters b are supplied to the tone generator memory 30. At the same time, the CPU 10 gives a tone color parameter write (register tone color parameters into memory) command c to a controller 31. Upon receiving the tone color parameter write command c, the controller 31 generates addresses at which the tone color parameters b are to be written into the tone generator memory 30, and gives a tone color parameter writing command d to the tone generator memory 30. As a result, the tone color parameters a read out from the RAM 11 are written into a predetermined region of the tone generator memory 30. Moreover, a tone color parameter table in which is written the leading address for each tone color parameter registered in the tone generator memory 30 is stored by the CPU 10 in a work area of the RAM 11.

When changing the tone color of a musical tone to be reproduced by the tone generator core 33, the CPU 10 gives a tone color changing command c to the controller 31. Having received the tone color changing command c, the controller 31 gives to the tone generator memory 30 a tone color parameter transmitting command d to transmit the specified tone color parameter to a cache memory 32. As a result, the tone generator memory 30 reads out the specified tone color parameters, and transmits the read out tone color parameter e to the cache memory 32. Moreover, although not shown in FIG. 2, during musical tone reproduction the tone generator core 33 converts sequence data supplied from the controller 31 into control data of a format peculiar to the tone generator core 33, and when reproduction timing for each event in the control data is reached, gives a tone color parameter read request h to the cache memory 32. Upon receiving the tone color parameter read request h, the cache memory 32 reads out a tone color parameter g, and sends the tone color parameter g to the tone generator core 33. Here, because the output bit width of the cache memory 32 is set at a bit width such that, for example, the tone color parameter g for one channel can be sent at a time, the tone color parameter can be set in the tone generator core 33 instantaneously. Through the above, the tone generator core 33 reproduces a musical tone of a tone color changed using the changed tone color parameters, and accordingly sends reproduction data i to the speaker 34, whereby the musical tone is sounded.

Figure 3:
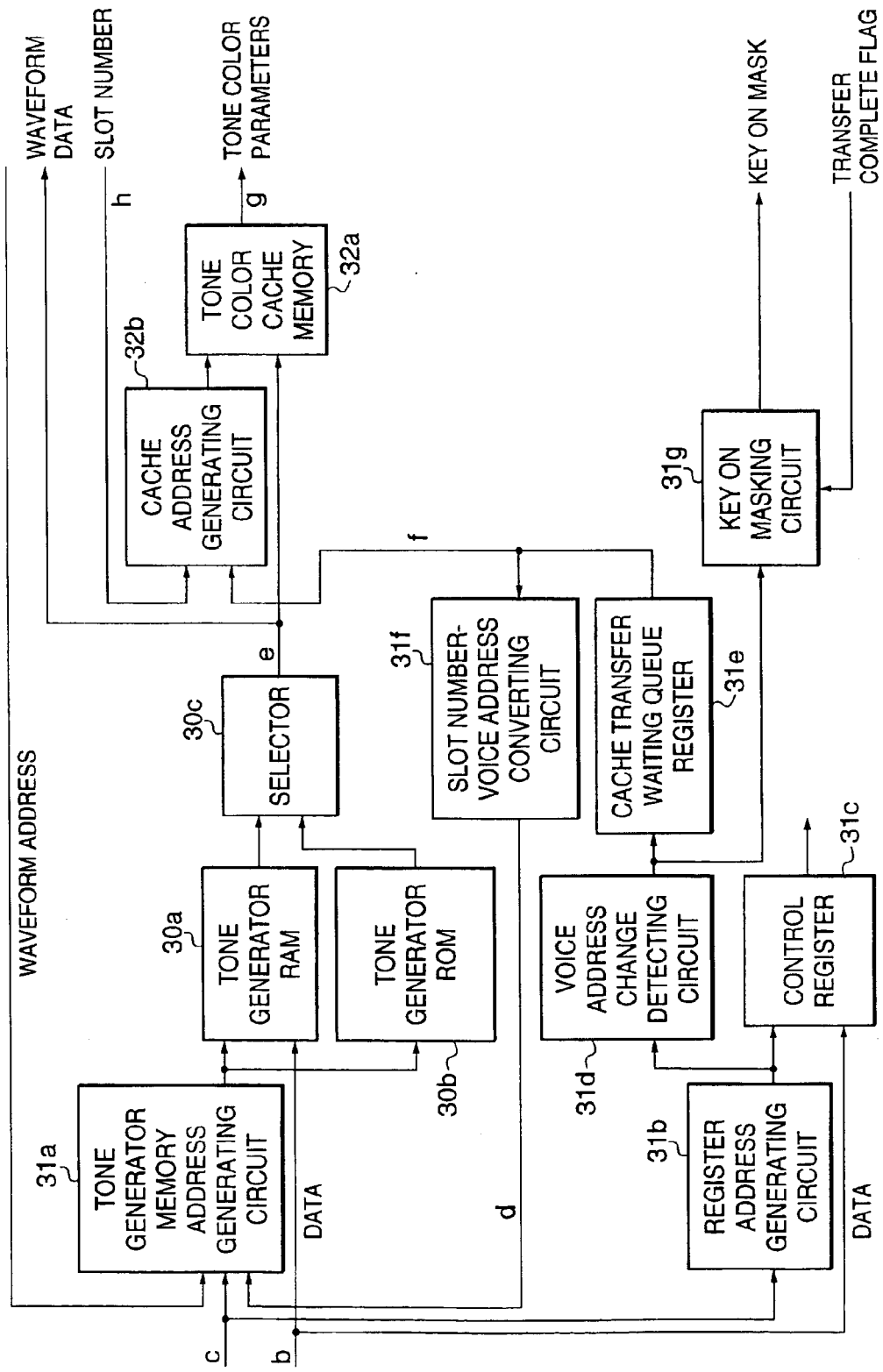
FIG. 3 is a diagram showing the detailed construction of a tone generator memory, a controller, and a cache memory in a tone generator hardware section appearing in FIG. 2.

Next, the operation of changing a tone color will be described in more detail, with reference to FIGS. 3 to 5. FIG. 3 is a diagram showing the detailed construction of the tone generator memory 30, the controller 31 and the cache memory 32 in the tone generator hardware section 15 appearing in FIG. 2, FIG. 4 is a diagram showing an example of the data structure of a tone color parameter group registered in a tone generator RAM 30a appearing in FIG. 3, and FIG. 5 is a diagram showing an example of the data structure of tone color parameters stored in a tone color cache memory 32a appearing in FIG. 3.

In FIG. 3, a tone color parameter write command c is given by the CPU 10 to a tone generator memory address generating circuit 31a, and addresses at which the tone color parameters to be registered are to be written are generated and given to an address input terminal of the tone generator RAM 30a. The tone generator RAM 30a is a general-purpose memory having an input bit width and an output bit width each of, for example, 8 bits. When the tone color parameter write command c is given by the CPU 10, a tone color parameter transmitting command a is also given by the CPU 10 to the RAM 11, and the tone color parameters b to be registered are read out. The read out tone color parameters b are given to a data input terminal of the tone generator RAM 30a. The tone color parameters b are then written into the tone generator RAM 30a one after another at address positions sequentially given by the tone generator memory address generating circuit 31a. At this time, a tone color parameter group of a freely chosen number of tone color parameters, for example all of a group of tone color parameters according to the GM tone generator specification, can be written into the tone generator RAM 30a. Moreover, the leading address for the writing of each tone color parameter into the tone generator RAM 30a is given to the tone generator memory address generating circuit 31a as part of the tone color parameter write command c by the CPU 10, and a tone color parameter table in which is written the leading address for each tone color parameter is stored in the RAM 11.

Figure 4:
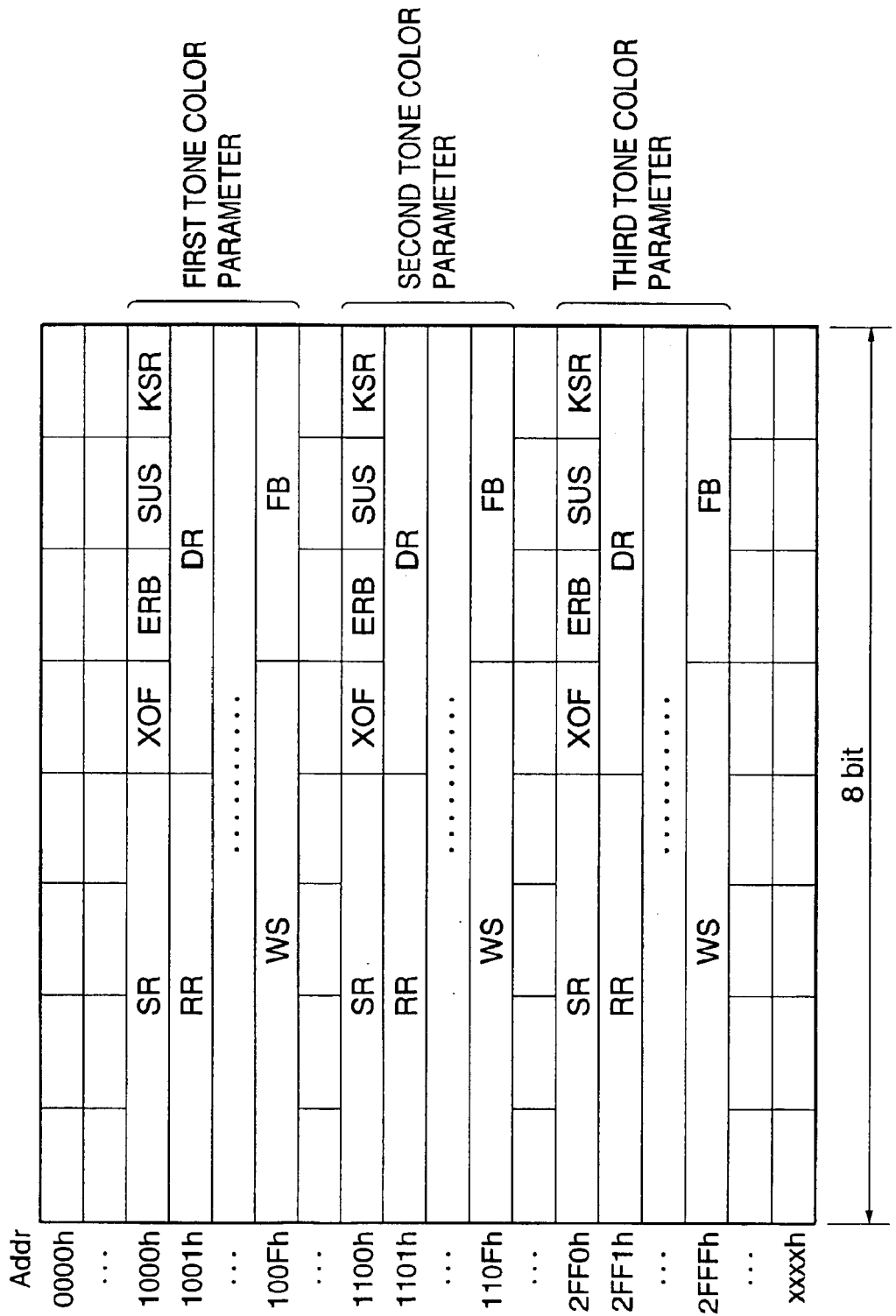
FIG. 4 is a diagram showing an example of the data structure of a tone color parameter group registered in a tone generator RAM appearing in FIG. 3.

The data structure of a tone color parameter group registered in the tone generator RAM 30a is, for example, as shown in FIG. 4. In FIG. 4, the bit width of the tone generator RAM 30a is made to be 8 bits, a first tone color parameter is stored at address "1000h" (h indicates a hexadecimal number) to address "100Fh", a second tone color parameter is stored at address "1100h" to address "110Fh", and a third tone color parameter is stored at address "2FF0h" to address "2FFFh". Each tone color parameter is stored, for example, in a region of 16 lines×8 bits of consecutive addresses, and hence each time an incremented address is given by the tone generator memory address generating circuit 31a, a fragment of 8 bits maximum of a tone color parameter is written into the tone generator RAM 30a. In the example shown in FIG. 4, each tone color parameter is thus divided into 16 fragments each of a size not more than 8 bits, and is registered in the tone generator RAM 30a in the form of 16 fragments. Tone color parameters from the first tone color parameter to an $m^{th}$ tone color parameter (where m is a freely chosen integer) registered in the tone generator RAM 30a are taken as a tone color parameter group. The tone color parameters shown in FIG. 4 are tone color parameters for an FM tone generator. Each tone color parameter is comprised of parameters such as SR (sustain rate), ERB (reverb on/off), SUS (sustain level), RR (release rate), DR (decay rate), WS (waveform selection), and FB (feedback level).

A predetermined tone color parameter group is stored in a tone generator ROM 30b in advance, and the data structure thereof is made to be like the example of the data structure shown in FIG. 4.

Moreover, when changing a tone color, a tone color changing command c outputted from the CPU 10 is applied to a register address generating circuit 31b. The specification of the tone color parameter for the tone color to be changed by the tone color changing command c is carried out by abbreviating the leading address in the tone generator RAM 30a and the channel number. The register address generating circuit 31b then rewrites a voice address for the channel in question in a voice address register in a control register 31c from the leading address and channel number for the tone color parameter specified by the tone color changing command c. The voice address register is comprised of registers for the maximum number of simultaneously sounded channels (slots), and the leading address for the tone color parameter set for each slot (channel) is written as a voice address into the register for that each slot. Which channel it is for which the corresponding voice address has been changed is then detected by a voice address change detecting circuit 31d, and the slot number corresponding to the channel for which the voice address has been changed is sent to a cache transfer waiting queue register 31e. The cache transfer waiting queue register 31e serves as a register for creating a slot number queue for transferring the tone color parameters sequentially when the change in tone color is to be carried out over a plurality of channels at once, and has a FIFO (first in first out) construction. The leading slot number outputted from the cache transfer waiting queue register 31e is given to a slot number—voice address converting circuit 31f, and referring to the voice address register in the control register 31c, the slot number—voice address converting circuit 31f converts the slot number into the voice address written in the register for the corresponding slot. As described above, this voice address is the leading address for the tone color parameter specified for the corresponding channel, and a tone color parameter transmitting command d containing the leading address is given by the slot number—voice address converting circuit 31f to the tone generator memory address generating circuit 31a.

The tone generator memory address generating circuit 31a determines whether the leading address contained in the tone color parameter transmitting command d is within the address range of the tone generator RAM 30a or within the address range of the tone generator ROM 30b, and reads out the specified tone color parameter from the tone generator RAM 30a or the tone generator ROM 30b having the address range within which is the leading address. Here, the tone generator memory address generating circuit 31a reads out the entire tone color parameter for one channel, by incrementing the address starting with the leading address 15 times, for example. The read out specified tone color parameter e is given to a data input terminal of the tone color cache memory 32a via a selector 30c. Moreover, the leading slot number outputted from the cache transfer waiting queue register 31e is also given to a cache address generating circuit 32b as a tone color parameter receiving command f. The tone color cache memory 32a is able to store tone color parameters for the maximum number of channels that can be simultaneously sounded, and the cache address generating circuit 32b generates a cache address corresponding to the given slot number, and gives this cache address to an address input terminal of the tone color cache memory 32a. As a result, the tone color parameter set for the slot number specified by the cache address in the tone color cache memory 32a is rewritten using the specified tone color parameter e sent from the selector 30c.

Sequence data, on the other hand, is given to the control register 31c, where the sequence data is converted into control data of a format peculiar to the tone generator core 33, and once reproduction timing for each event in the control data has been reached, setting into the tone generator core 33 from the control register 31c is carried out. As a result, the tone generator core 33 progressively reproduces musical tones based on the sequence data; moreover, at this time the tone color parameter set for each channel for which the tone generator core 33 carries out reproduction is received from the tone color cache memory 32a. Specifically, when the reproduction timing for each event has been reached, the tone generator core 33 gives the slot number corresponding to the channel for which reproduction is to be carried out to the cache address generating circuit 32b as a tone color parameter read request h. Upon receiving the tone color parameter read request h, the cache address generating circuit 32b generates the cache address of the position where the tone color parameter set for the slot number in question is stored, and gives this cache address to the tone color cache memory 32a. As a result, the tone color parameter set for that slot number is sent to the tone generator core 33, for example, at a time, and the tone generator core 33 carries out musical tone reproduction for the channel corresponding to the slot number in question using the sent tone color parameter.

Here, an example of the data structure of the tone color parameters stored in the tone color cache memory 32a is shown in FIG. 5. As shown in FIG. 5, the output bit width of the tone color cache memory 32a is set at several tens of bits such that each tone color parameters for one channel comprised of parameters from a parameter SR to a parameter FB can be contained in one row. The tone color cache memory 32a has a number of rows equal to the maximum number of channels that can be simultaneously sounded by the tone generator core 33. Specifically, the tone color parameter for channel 1 is stored in the first row (#0), the tone color parameter for channel 2 is stored in the second row (#1), and so on up to the tone color parameter for channel N which is stored on the Nth row (#N). Here, N is the maximum number of channels that can be simultaneously sounded minus one. Because the tone color cache memory 32a has a large output bit width (e.g. approximately 60 bits) as described above, a tone color parameter for one channel can be sent to the tone generator core 33 at a time. As a result, the tone color parameters can be sent to the tone generator core 33 instantaneously, and hence musical tone reproduction can be carried out without a break in sound generation.

Moreover, it is arranged such that when a tone color is being changed, until the transfer of the specified tone color parameters to the tone color cache memory 32a has been completed, the corresponding key on event process is suspended (key on mask) so that the musical tone of the tone color after the change will be reproduced reliably. To this end, the voice address change detecting circuit 31d gives information on the slot number corresponding to the channel for which the tone color to be outputted has been changed to a key on masking circuit 31g. The key on masking circuit 31g generates a key on mask signal for masking key on for the channel corresponding to the given slot number information, and sends this key on mask signal to the tone generator core 33. As a result, in the tone generator core 33, key on for that channel is masked, and musical tone reproduction is suspended. Once transfer of the specified tone color parameter to the tone color cache memory 32a has been completed, a transfer complete flag is set, and the key on masking circuit 31g is reset to the original state. As a result, the rewritten tone color parameter newly set for the slot number in question is sent to the tone generator core 33, and hence using the sent tone color parameter, the tone generator core 33 can carry out musical tone reproduction reliably with the changed tone color for the channel in question.

Moreover, in the case that the tone generator core 33 is comprised of a PCM tone generator, various sampling waveforms can be stored in the tone generator ROM 30b and the tone generator RAM 30a. During musical tone reproduction, a waveform address for the specified tone color is given by the tone generator core 33 to the tone generator memory address generating circuit 31a. The tone generator memory address generating circuit 31a determines whether the given waveform address is within the address range of the tone generator RAM 30a or within the address range of the tone generator ROM 30b, and reads out the specified waveform data from the tone generator RAM 30a or the tone generator ROM 30b having the address range within which is the waveform address. The read out waveform data is given to the tone generator core 33 via the selector 30c, and the tone generator core 33 carries out musical tone reproduction with the specified tone color using this waveform data.

The tone generator RAM 30a is thus made to be a general-purpose memory in which can be stored not only tone color parameters but also other data.

Figure 6:
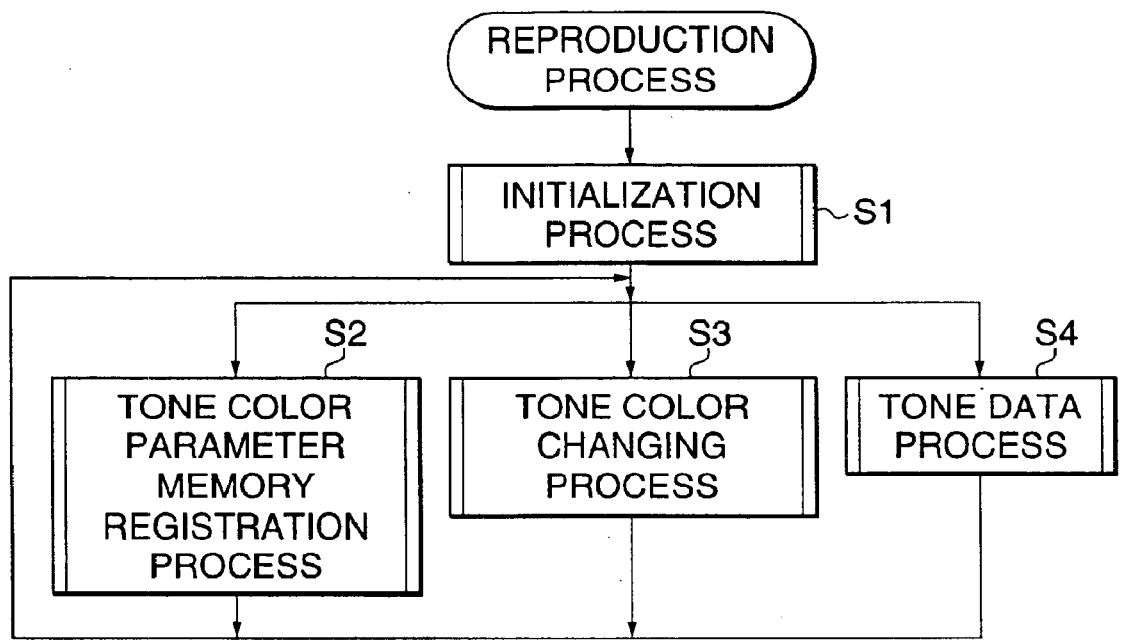
FIG. 6 is a flowchart of a reproduction process carried out by the tone generator hardware section appearing in FIG. 2.

Next, a flowchart of the reproduction process carried out by the tone generator hardware section 15 appearing in FIG. 2 is shown in FIG. 6.

In the case that the mobile phone 1 having the musical tone reproducing apparatus is set such that a melody informing of an incoming call is reproduced by the musical tone reproducing apparatus, an instruction for musical tone reproduction is issued upon receipt of an incoming call, whereby the reproduction process shown in FIG. 6 is started. In step S1, an initialization process is carried out in which the tone generator hardware section 15 is initialized, for example various registers are reset or set to default values. Then, a tone color parameter memory registration process of step S2, a tone color changing process of step S3, and a tone data process of step S4 are carried out in parallel. The processes of these steps S2 to S4 are carried out repeatedly until the sequence data comes to an end or a stop instruction is issued, whereby reproduced musical tones are outputted based on the sequence data.

Next, the processes of steps S2 to S4 in FIG. 6 will be described with reference to FIGS. 7 to 9.

Figure 7:
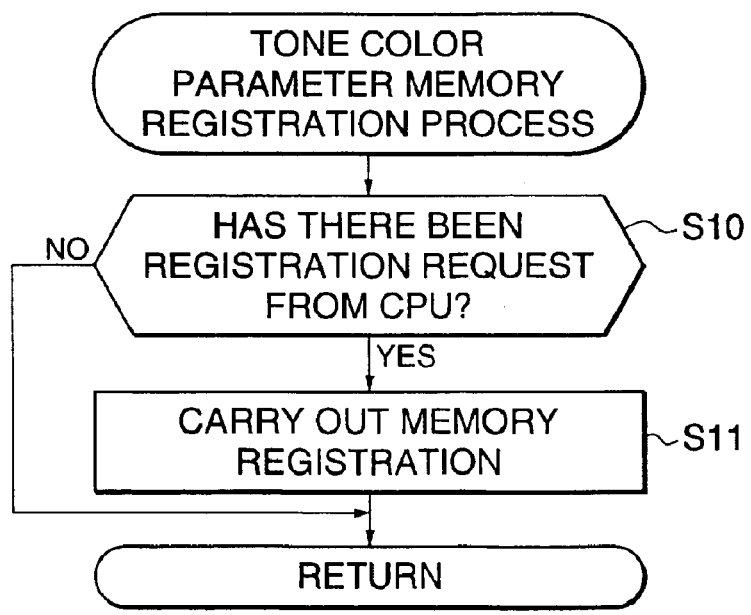
FIG. 7 is a flowchart of a tone color parameter memory registration process of step S2 in FIG. 6.

First, a flowchart of the tone color parameter memory registration process of step S2 in FIG. 6 is shown in FIG. 7.

After the instruction to start musical tone reproduction has been issued and the initialization process has been carried out, upon a user operating buttons of the input section 17 to select tone color parameter memory registration, the tone color parameter memory registration process shown in FIG. 7 is started. In step S10 in FIG. 7, it is determined whether or not there has been a registration request from the CPU 10. Here, in the case that a tone color parameter write command c has been given to the tone generator hardware section 15 and a tone color parameter transmitting command a has been given to the RAM 11 by the CPU 10, the answer is determined to be "YES" and the process proceeds to step S11, where in step S11 tone color parameters read out from the RAM 11 are registered in the tone generator RAM 30a of the tone generator memory 30. Once the registration has been completed, the tone color parameter memory registration process ends, and the process returns to the steps after step S1. Moreover, in the case that it is determined in step S10 that there has not been a registration request from the CPU 10, again the tone color parameter memory registration process ends, and the process returns to the steps after step S1.

Figure 8:
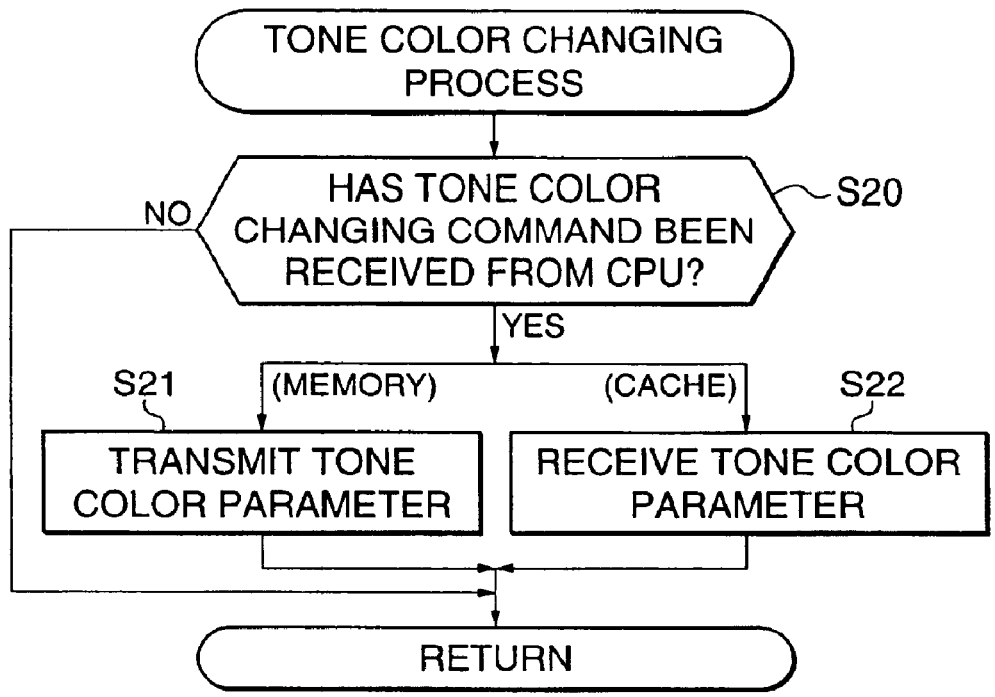
FIG. 8 is a flowchart of a tone color changing process of step S3 in FIG. 6.

Next, a flowchart of the tone color changing process of step S3 in FIG. 6 is shown in FIG. 8.

In FIG. 8, after the instruction to start musical tone reproduction has been issued and the initialization process has been carried out, upon the tone color changing process being started through a tone color change message or the like embedded in the sequence data, in step S20 it is determined whether or not a tone color changing command has been received from the CPU 10. Here, in the case that the CPU 10 has given a tone color changing command c to the controller 31 of the tone generator hardware section 15, the answer is determined to be "YES", and the process proceeds to step S21 and step S22. In step S21, the specified tone color parameter is read out from the tone generator RAM 30a or the tone generator ROM 30b, and is transmitted to the tone color cache memory 32a. Moreover, in step S22, which is carried out in parallel with step S21, the transmitted tone color parameter is received by the tone color cache memory 32a, and the tone color parameter for the specified channel is rewritten. Once the processes of step S21 and step S22 have been completed, the tone color changing process ends, and the process returns to step S1. Moreover, in the case that it is determined in step S20 that a tone color changing command has not been received from the CPU 10, again the tone color changing process ends, and the process returns to step S1.

Figure 9:
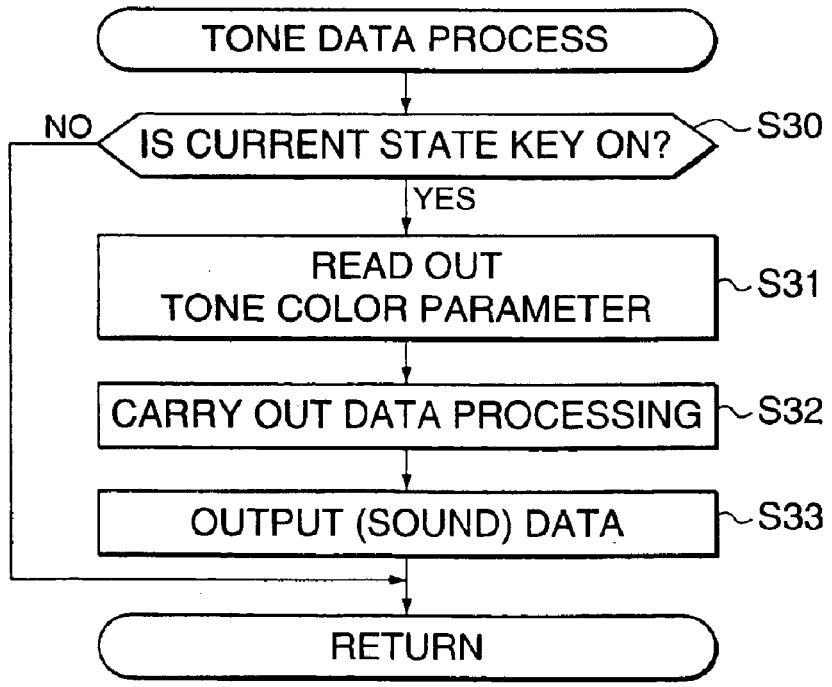
FIG. 9 is a flowchart of a tone data process of step S4 in FIG. 6.
Figure 10:
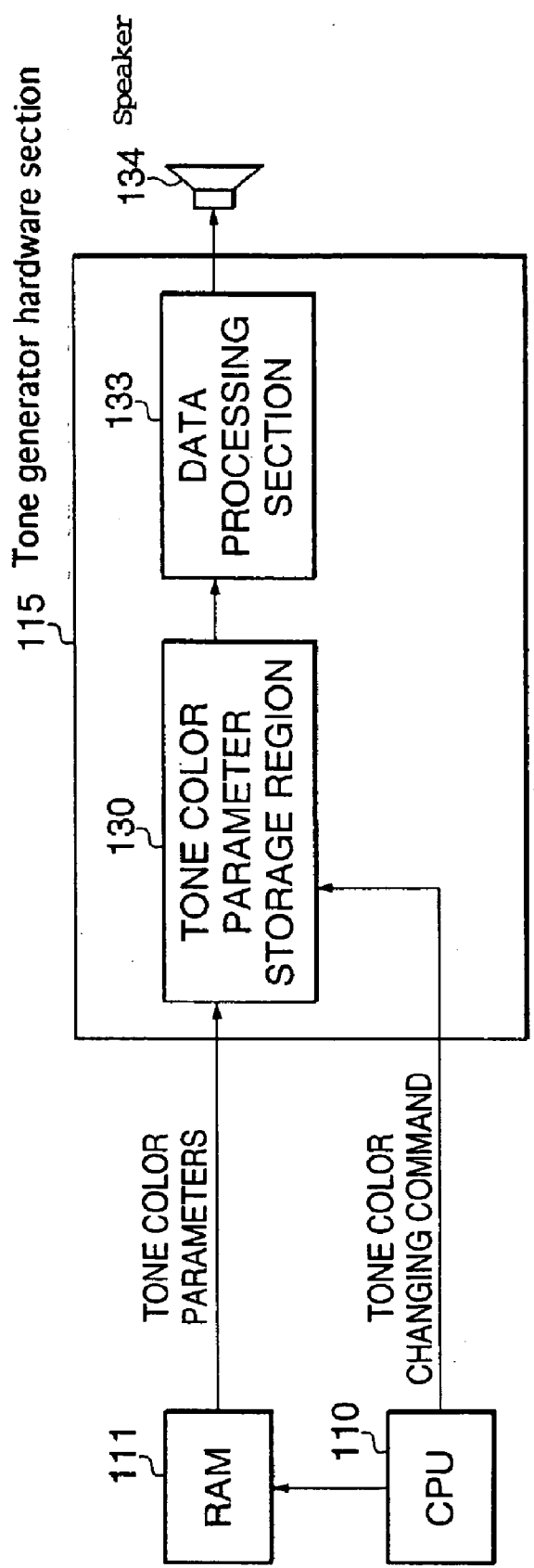
FIG. 10 is a diagram showing an example of the construction of a conventional musical tone reproducing apparatus.

Next, a flowchart of the tone data process of step S4 in FIG. 6 is shown in FIG. 9.

After the instruction to start musical tone reproduction has been issued and the initialization process of the tone generator hardware section 15 has been carried out, when reproduction timing for each event in the control data been has reached, the control data is set into the tone generator core 33 by the controller 31. As a result, when the timing of reproduction of a musical tone has been reached, the tone data process is started. In step S30, it is then determined whether or not key on has been set in the tone generator core 33 and the current state is key on. Here, in the case that key on has been set, the answer is determined to be "YES" and the process proceeds to step S31, where the tone generator core 33 reads out the tone color parameter for the channel for which reproduction is to be carried out from the tone color cache memory 32a. Next, in step S32, data processing is carried out in which musical tone reproduction is carried out based on the read out tone color parameter and the control data that has been set in the tone generator core. Then, in step S33, the reproduced musical tone data is outputted (sounded). Once the process of step S33 has been completed, the tone data process ends, and the process returns to step S1. Moreover, in the case that it is determined in step S30 that the current state is not key on, again the tone data process ends, and the process returns to step S1.

In the above description, it is arranged such that a tone color parameter for one channel is sent to the tone generator core 33 with one access from the tone color cache memory 32a; however, the output bit width may be narrowed somewhat so that a tone color parameter for one channel is sent to the tone generator core 33 with a few accesses. Even in this case, there will be virtually no effect in terms of sound generation break due to the time taken for the process in question.

The musical tone reproducing apparatus of the present invention described above cannot only be applied to a mobile phone 1 as described above as the portable terminal apparatus, but may also be applied to a portable information apparatus capable of outputting musical tones, a portable personal computer capable of outputting musical tones, and so on. In this case, the music contents data may be reproduced in synchronization with text and/or image contents.

Moreover, the tone generator core 33 in the tone generator hardware section 15 may be comprised of a tone generator of frequency modulation type, i.e. an FM tone generator. Such an FM tone generator utilizes harmonics generated by frequency modulation for synthesis of musical tones, and is capable of generating waveforms having harmonic components containing non-harmonic tones with relatively simple circuitry. Such an FM tone generator is also capable of generating a wide variety of musical tones from synthesized tones simulating natural musical instruments to electronic bleeps. Such an FM tone generator employs oscillators called "operators" that equivalently oscillate sine waves, for example the FM tone generator may be comprised of a first operator and a second operator that are cascaded with each other. Moreover, such an FM tone generator may be constructed such that an output from an operator is itself fed back and inputted.

Furthermore, the tone generator type of the tone generator core 33 of the tone generator hardware section 15 is not limited to the FM tone generator type, but rather may be a waveform memory tone generator (PCM tone generator or ADPCM tone generator) type, a physical model tone generator type, and so forth. In terms of the construction of the tone generator, a hardware tone generator using a DSP or the like may be employed.

Industrial Applicability

As described in detail above, the musical tone reproducing apparatus according to the present invention has a tone generator memory as a general-purpose memory in which is registered at least a tone color parameter group comprising a freely chosen number of tone color parameters read out from the system storage means, a cache memory into which are inputted tone color parameters from the registered tone color parameter group at a predetermined data width from the tone generator memory and from which are outputted the inputted tone color parameters at a data width larger than the predetermined data width, and hence during changing of tone color, a tone color parameter that has been read out from the tone generator memory may be transferred into the cache memory. In this case, because the tone color parameter group of a freely chosen number of tone color parameters has been registered in the tone generator memory, the need to transfer a tone color parameter from a system control means to the tone generator memory each time a tone color is to be changed can be removed as much as possible. Moreover, because the output bit width of the cache memory has been made to be large, the tone color parameter can be set into the tone generator means instantaneously. Consequently, even though the tone color parameters are stored in advance in the tone generator memory, the time taken for the tone color changing process can be shortened, and hence the occurrence of a break in sound generation during tone color changing can be prevented.

According to the musical tone reproducing apparatus according to the present invention, the system control means reads out each of the tone color parameters from the tone generator memory by specifying a leading address of the predetermined addresses given to the tone color parameters, and hence the amount of data transfer between the system control means and the musical tone reproducing apparatus can be reduced.

What is claimed is:

1. A musical tone reproducing apparatus that is provided in a portable terminal apparatus and connected through a bus to a system controller, and that carries out musical tone reproduction, the musical tone reproducing apparatus comprising:

a tone generator memory that has a first input terminal having a first bit width, a first output terminal having the first bit width, and a storage region constructed based on the first bit width, is capable of storing various data including tone color parameters, and is used for general purpose use;

a cache memory that has a second input terminal and a second output terminal having a second bit width larger than the first bit width;

a tone generator; and a tone generator controlling device, wherein, the system storage devices stores beforehand one channel's worth of a plurality of tone color parameters to be used for generation of a predetermined tone color in units of a first bit width, said tone generator memory is supplied at the first input terminal thereof with one channel's worth of the plurality of tone color parameters from the system storage device via the bus by a plurality of times of transfer under control of the system controller and stores therein the supplied tone color parameters, when a tone color is to be changed, the one channel's worth of the plurality of tone color parameters that are read out from the first output terminal of said tone generator memory are sequentially transferred to the second input terminal of said cache memory and stored in said cache memory, said tone generator controlling device supplies said tone generator with control data generated based on sequence data in a reproduction timing of the control data, and supplies said cache memory with a read request when the tone color is used, said cache memory outputs the one channel's a worth of the plurality of tone color parameters from the second output terminal thereof to said one generator by a one time transfer in accordance with the read request supplied from said tone generator controlling device, and said tone generator reproduces a musical tone based on the one channel's worth of the plurality of tone color parameters and the control data.

2. The musical tone reproducing apparatus as claimed in claim 1, wherein said tone generator controlling device reads out the tone color parameter from said tone generator memory by specifying a leading address given to the tone color parameter for the tone color to be changed.

3. The musical tone reproducing apparatus as claimed in claim 1, wherein said first tone generator is a random access memory.

4. The musical tone reproducing apparatus as claimed in claim 1, wherein the portable terminal apparatus has a receiver for receiving external data, and the external data received by said receiver is stored in said system storage device.

5. A musical tone reproducing apparatus as claimed in claim 1, wherein said system controller carries out a portable terminal function process as a main process.

6. A method of controlling a musical tone reproducing apparatus, that is provided in a portable terminal apparatus, and is connected through a bus to a system controller and a system storage device in the portable terminal apparatus, to carry out musical tone reproduction, comprising the steps of:

storing in the system storage device, beforehand, one channel's worth of a plurality of tone color parameters to be used for generation of a predetermined tone color in units of the first bit width;

supplying at a first input terminal of said tone generator memory the one channel's worth of the plurality of tone color parameters from the system storage device via the bus by a plurality of time of transfers under control of the system controller;

storing, in the tone generator memory, the supplied tone color parameters;

reading out, when a tone color is to be changed, the one channel's worth of the plurality of tone color parameters and sequentially transferring the one channel's worth of the plurality of tone color parameters to the second input terminal of the cache memory;

storing the one channel's worth of the plurality of tone color parameters in the cache memory;

supplying said tone generator with control data generated based on sequence data in a reproduction timing of control data;

supplying said cache memory with a read request when the tone color is used;

outputting, from said cache memory, the one channel's worth of the plurality of tone color parameters from the second output terminal thereof to the tone generator by a one time transfer in response to the read request; and causing the tone generator to generate a musical tone based on the outputted one channel's worth of the plurality of tone color parameters and the control data.

* * * * *